March 23, 1954   H B. SCHOFIELD   2,672,773
TABLE INDEXING MECHANISM
Filed Oct. 28, 1952   4 Sheets-Sheet 1

INVENTOR.
H. Bruce Schofield.
BY
Wood, Herron & Evans.
ATTORNEYS.

March 23, 1954

H B. SCHOFIELD 2,672,773

TABLE INDEXING MECHANISM

Filed Oct. 28, 1952

INVENTOR.
H. Bruce Schofield.
BY
Wood, Herron & Evans.
ATTORNEYS.

March 23, 1954     H B. SCHOFIELD     2,672,773
TABLE INDEXING MECHANISM
Filed Oct. 28, 1952     4 Sheets-Sheet 3
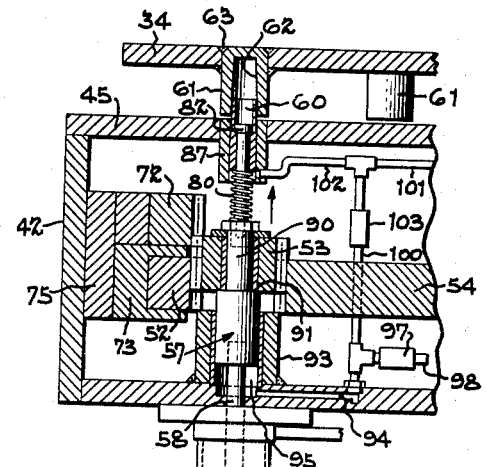
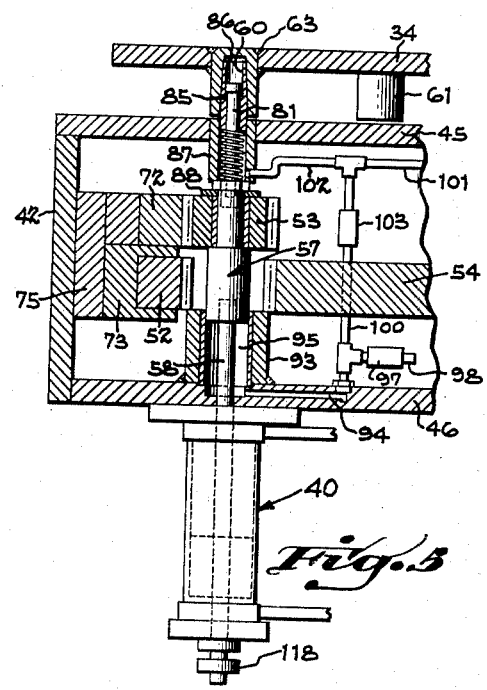
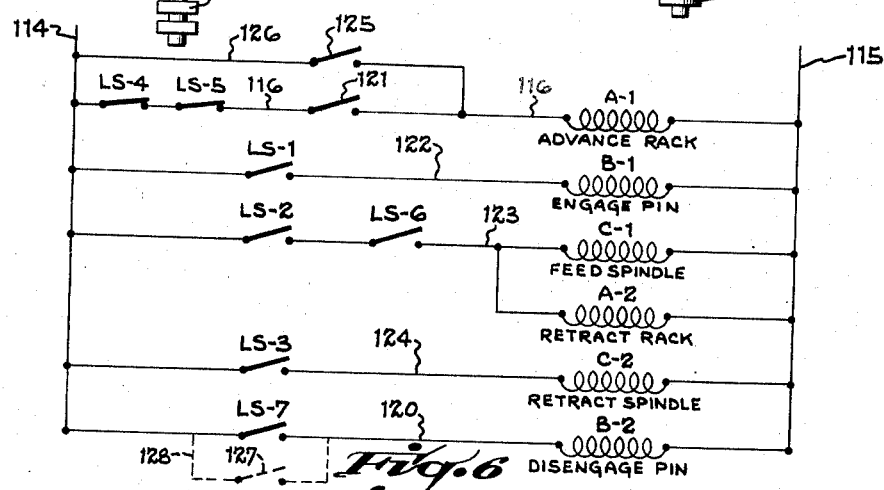
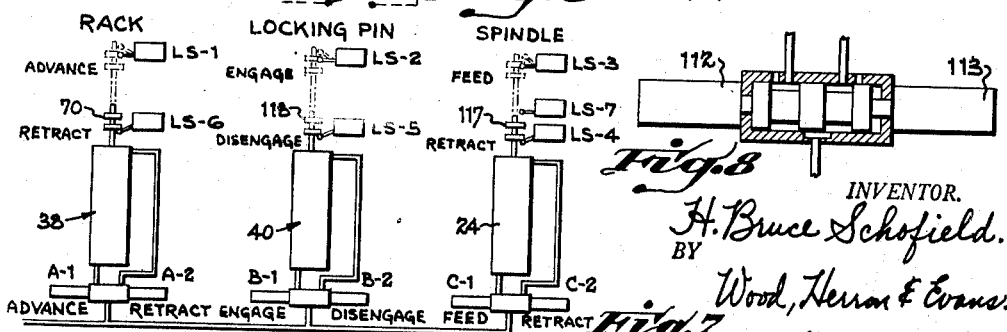
INVENTOR.
H. Bruce Schofield.
BY
Wood, Herron & Evans.
ATTORNEYS.

Patented Mar. 23, 1954

2,672,773

UNITED STATES PATENT OFFICE 2,672,773

TABLE INDEXING MECHANISM

H. Bruce Schofield, Cincinnati, Ohio

Application October 28, 1952, Serial No. 317,246

18 Claims. (Cl. 77—64)

This invention relates to an indexing mechanism adapted to index or advance work pieces in rotary stepwise progression from a loading station relative to one or more operating stations, and finally to a delivery or unloading station.

Indexing mechanisms of this general nature are utilized to a great extent in mass production operations and more particularly in the machining of parts, either metal or other material, in a rapid, automatic manner. In the present disclosure, which represents a typical embodiment of my invention, the improved indexing mechanism is shown applied to a conventional drill press; however it will be understood that the invention is applicable to a wide variety of standard machines and machine tools.

A primary object of the invention is to provide a self-contained indexing unit which is relatively flexible in respect to the number of indexing stations or degree of rotary stepwise advancements, whereby the same basic unit can be set up to accommodate various types of conventional machines.

In its simplest aspect, the present indexing mechanism consists of a table which is mounted for rotation upon a vertical axis, combined with a pair of fluid pressure cylinders, one being an indexing cylinder for advancing the table in rotary steps and the second being a locking cylinder for locking the table rigidly in its successive indexed positions. A fluid pressure system, including electrically operated valves, regulates in proper sequence the operations of the two cylinders, such that the table is released during each indexing advancement and locked as each advancement is completed. The three sequential operations of unlocking the table, indexing it for one step, then locking the table in its indexed position, is designated an "indexing cycle"; thus each complete revolution of the table consists of a number of such cycles.

A series of work holding fixtures is mounted upon the table at uniform radial spacing, corresponding in degree to the rotary table advancement imparted upon each indexing cycle. When mounted upon a machine tool, the indexing table is so related to the machining element, such as a drill spindle, that the work pieces are advanced from the loading station and indexed individually into accurate alignment with the spindle. In many instances, a plurality of spindles is utilized, the several spindles being located on centers corresponding to the work fixtures, such that several operations can be performed simultaneously upon each indexing step or cycle.

The utilization of a fluid pressure cylinder to index the table, as distinguished from mechanical means, allows the degree of table advancement per cycle to be varied, and this forms an important aspect of the invention. For this purpose the effecting lineal piston stroke of the indexing cylinder, which is converted into rotary table motion, is under the control of an adjustable stop. This stop may be regulated to change the length of stroke and thus change the degree of rotation per cycle as required.

Another advantage of the fluid pressure cylinder resides in an arrangement by which the lineal piston motion is cushioned at its stroke limits. This eliminates the factor of shock and rapid wear of critical parts, which is usually associated with mechanical indexing drives, such as the Geneva motion.

It is another object of my invention to provide an improved locking mechanism which is adapted to bring the table accurately to its final indexed position as an incident to locking it, whereby the work centers are accurately aligned with the axis of the machining element; also to provide means whereby the locking mechanism is not subject to wear and misalignment, even after prolonged usage.

Accurate positioning of the table is critical in practically all operations; for example in drilling holes, the hole center must be precisely lined up with the axis of the drill in order to locate the holes within prescribed tolerances. In multiple machine operations such as drilling and reaming corresponding holes simultaneously in adjacent work pieces, accurate registration of the work pieces is even more critical.

To provide precise registration, a taper pin, which is shifted axially with respect to correspondingly tapered indexing sockets in the table, serves to bring the table to its final position and to lock it rigidly at the end of each indexing cycle. In order to prevent wear and loss of precision, the taper pin is forced in the sockets under predetermined but limited endwise pressure by a preloaded spring which is effective between the lock cylinder and locking pin. The small amount of wear which may occur after prolonged service is thus taken up automatically by the spring, and precise registration is preserved for the life of the mechanism.

It will be understood that the reciprocation of the indexing piston is effective to rotate the table only during the working stroke and that the piston must be disconnected from the table in order that it may be retracted for the next cycle. The lineal piston motion is converted into rotary table motion by means of a rack meshing with a pinion, the pinion in turn meshing with a gear which rotates the table. The rack is fixed to the end of the indexing piston rod such that the table is rotated during the working stroke; however during the return stroke, the pinion is shifted out of mesh from the rack to allow the rack to retract free of the table.

Another important object has been to provide a structure which is effective to shift the locking pin to its locking position, and concurrently, to shift the pinion to its unmeshed position with respect to the rack, thereby performing both functions by operation of the locking cylinder.

Aside from structural simplicity and elimination of parts, this arrangement provides positive operation since the table is locked automatically when the pinion is disengaged, thereby preventing shifting of the table from its final indexed position between the time the pinion disengages and the locking pin engages.

During the indexing cycle, the piston, in response to fluid pressure, either hydraulic or air, rotates the table at a rapid rate and slows it down or cushions it progressively as it approaches a positive stop, thereafter to be engaged and precisely positioned by the lock pin.

The two cylinders, working in time with one another, are thus effective to index the table rapidly through its cycles, but at the same time, provide precise registration without shock and wear of the parts. The positive stop is engaged after the indexing piston is slowed almost to a stop, and the cushioning of the piston is effective to absorb the momentum or kinetic energy stored in the rotating table. In this way there is no overrun of the table and no sudden stoppage of the moving parts.

When the indexing mechanism is mounted upon a machine tool for automatic operation, a set of limit switches is associated with the spindle or other movable element of the tool and adapted to be actuated in response to the movements of the element. These switches are interconnected in an electrical control system which includes the above noted electrically operated valves which regulate the locking and indexing cylinders. The arrangement is such that the indexing cycle is initiated when the machining element shifts to a retracted position at completion of an operation; thus the table is indexed when the tool is out of contact with the work piece. Once the cycle is initiated, the limit switches respond to the motion of the indexing and lock cylinders in sequence to complete the cycle. The control system is effective to provide continuous cyclic operation in time with the machine tool so that the operator simply places the work pieces in the fixtures and removes them as they reach a discharge station in finished condition.

Another object of the invention has been to provide a lubricating system which utilizes the reciprocations of the locking mechanism to pump oil to the moving parts in an automatic manner. For this purpose, the locking pin mechanism includes a plunger reciprocating axially in a bore which is submerged in an oil reservoir. Suitable valved oil passageways and conduits extend from the bore to the points to be lubricated, such that a shot of oil is delivered upon each indexing cycle.

As explained earlier, the indexing mechanism is relatively flexible in respect to the number of indexing stations and table size so that it may be furnished to the user to suit his particular requirements without expensive refabrication. It will be recognized that a table having the required number of indexing sockets can readily be installed and that the stroke of the indexing piston is correlated to the spacing by adjusting the positive stop and limit switches. It will be understood that the mode of operation is substantially the same whether the cylinders are operated by hydraulic or air pressure.

Various other features and advantages of the invention will be more fully disclosed in the following detailed description taken in conjunction with the drawings.

In the drawings:

Figure 4 is a fragmentary view taken from Figure 3, showing the lock plunger as it advances toward the locking position, with the pinion partially meshed with the fixed rack.

Figure 5 is a view similar to Figure 4, showing the lock plunger fully elevated to locking position.

Figure 6 is a diagrammatic view illustrating an electrical circuit which is adapted to operate the indexing mechanism in synchronism with the operations of the drill press.

Figure 7 is a diagrammatic view of the several cylinders and limit switches of the control circuit which provide sequential operation of the indexing mechanism in time with the movements of the drill spindle.

Figure 8 is a diagrammatic sectional view of an electrically operated reversing valve, illustrating its operating principle.

GENERAL ARRANGEMENT

Figure 1:
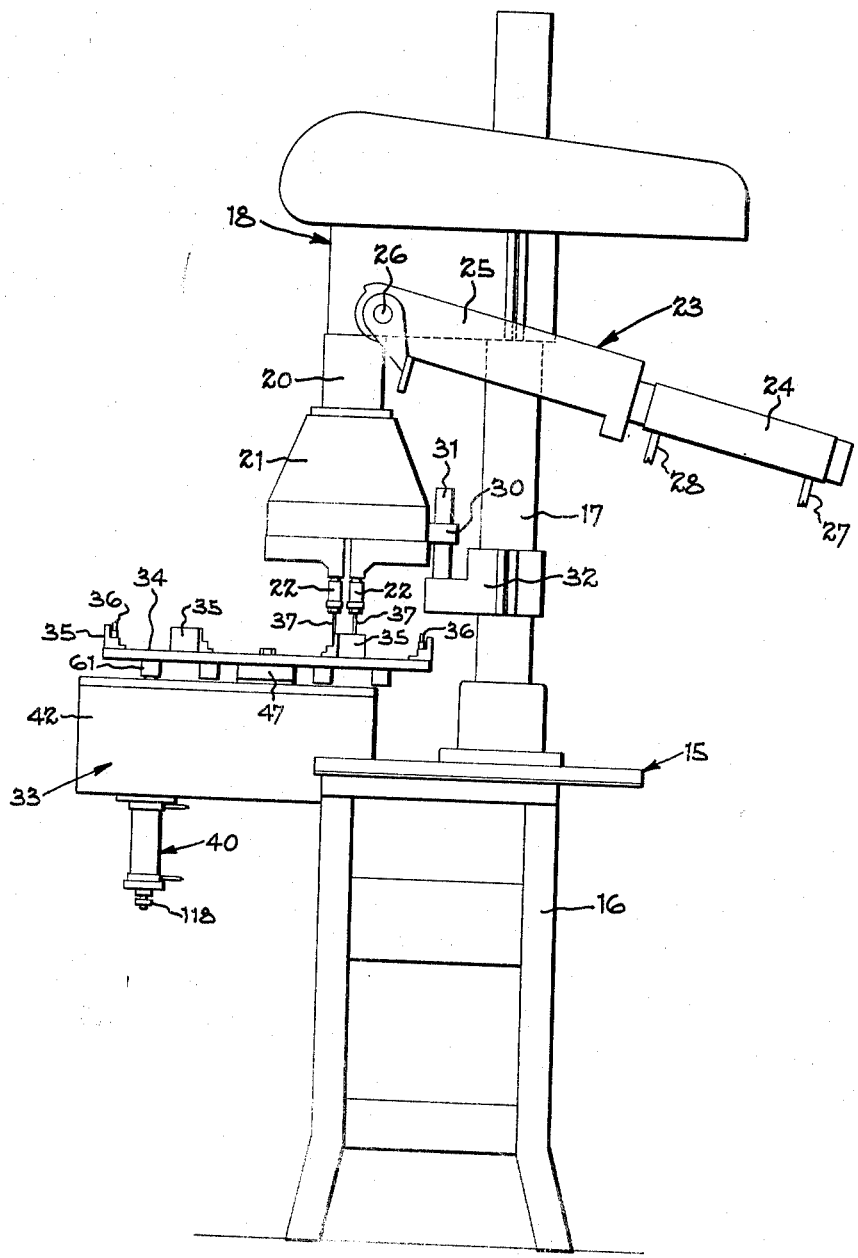
Figure 1 is a general side elevation of a conventional drill press with the present indexing mechanism applied to the press to provide automatic operation.

As explained above, the improved indexing mechanism is intended to be applied, as an attachment, to machines of various types in which work pieces are advanced serially from a loading station indexed into accurate alignment with one or more machining elements, then advanced in finished condition to a discharge or unloading station. The mechanism is arranged either for manual control in conjunction with hand regulated machines, or for automatic operation in time with the operations of the machine for rapid mass production work.

Under automatic regulation, the components of the indexing mechanism are interconnected by and bottom plate 46 of housing 42. The table includes a hub 47 welded in its center and embracing the upper end of shaft 41, a key 48 being interposed between the hub and shaft to lock the table to the shaft.

Figures 2, 3:
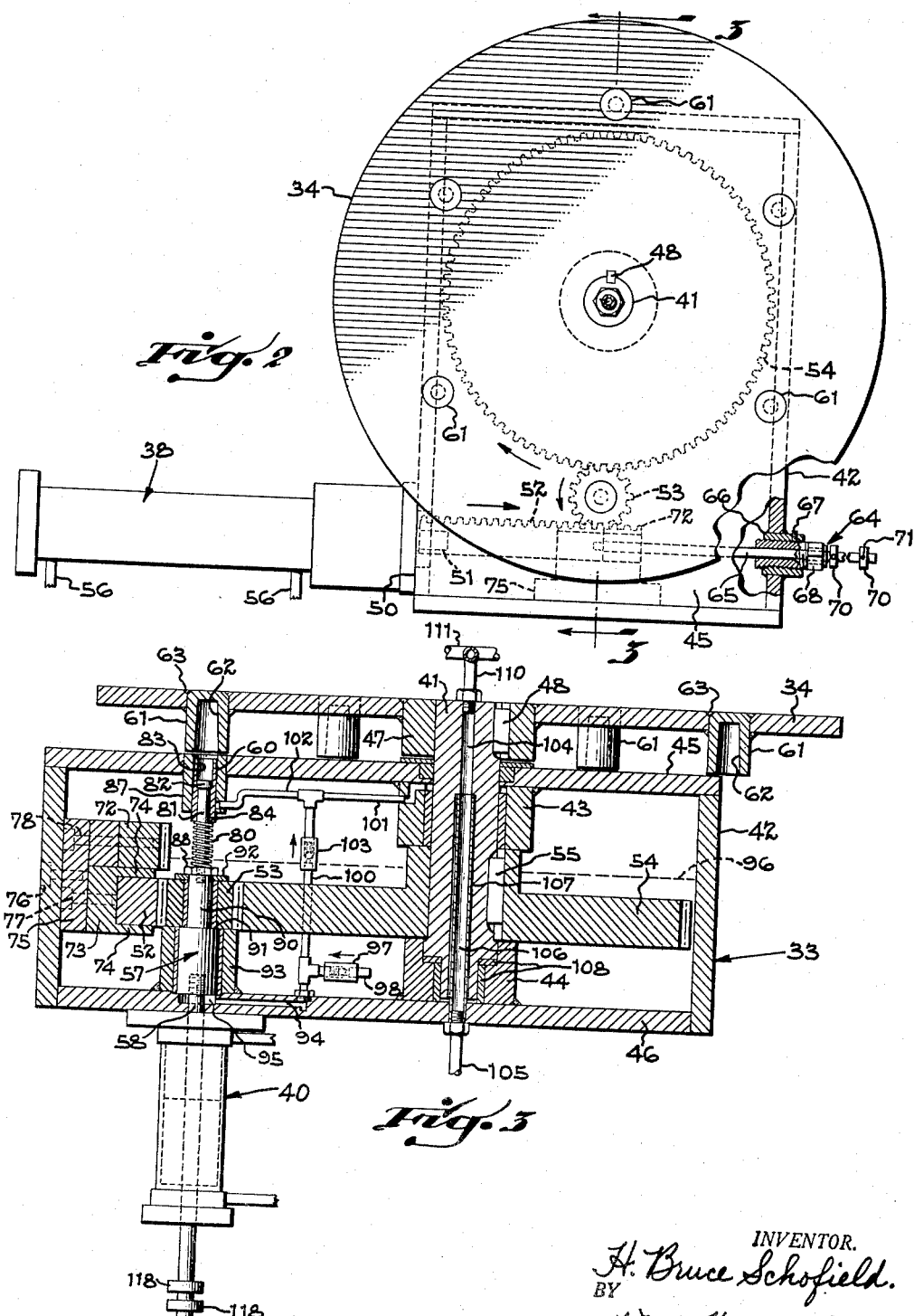
Figure 2 is an enlarged top plan view of the indexing unit removed from the drill press, showing the general arrangement, with parts broken away to illustrate certain details.
Figure 3 is a sectional view taken on lines 3—3, Figure 2, illustrating the internal construction of the indexing mechanism, with the lock plunger in released position and with the pinion in mesh with the indexing rack and gear.

The fluid pressure indexing cylinder 38 is mounted upon the side of housing 42, as indicated at 50 in Figure 2. The cylinder includes a piston (not shown) having a piston rod 51 which extends forwardly from the piston into the gear housing. The lineal movements of the piston rod are transmitted to the table by the rack 52 having its end fastened to the piston rod and meshing with an idler pinion 53. Pinion 53 in turn meshes with a gear 54 which is keyed as at 55 to shaft 41 (Figure 3). In the position shown in Figure 2, the rack 52 is retracted and it will be understood that advancement of the rack toward the right will rotate the idler in the direction indicated by the arrow in Figure 2, causing the gear 54 and table 34 to rotate in the direction indicated. Fluid pressure is applied to the opposite ends of cylinder 38 alternately by way of the conduits 56—56, to provide the advancement and retraction of the rack.

It will be recognized that in order to provide stepwise advancement of the table in the same direction, it is necessary to disengage the rack from the table gear train during the retracting motion of the rack. For this purpose the idler pinion 53 is shifted out of mesh with the rack at the end of the feed stroke, allowing the table to remain stationary during retraction.

As shown in Figure 3, idler pinion 53 is loosely mounted for rotation upon a plunger 57. Plunger 57 in turn is mounted for vertical reciprocation, being fastened to the piston rod 58 of the locking cylinder 40. The application of fluid pressure to cylinder 40 thus is effective to shift the idler pinion 53 upwardly, as indicated in Figures 4 and 5, causing the idler to be disengaged from the gear 54 and at the same time to shift a locking pin 60 to locking position with respect to the indexing table.

As explained later in detail, the lock plunger and idler are shifted upwardly to locking position automatically at the limit of the feed stroke of the rack and remain in this position while the rack retracts, so as to lock the table rigidly in indexed position. The lock pin remains elevated during the machining operation and is shifted downwardly only after the vertical spindle 20 is elevated. At this point the next cycle is initiated, causing the lock plunger to move downwardly to disengaged position and causing the idler pinion to mesh. Downward movement of the lock plunger causes the indexing cylinder to advance the rack in a direction to index the table. Upon reaching the limit of its indexing stroke, the lock plunger is again shifted upwardly to locking position.

These operations are executed in sequence with one another by means of limit switches which are tripped in response to the movements of the indexing rack and lock plunger. In other words, after the cycle is initiated, the rack movement controls the operation of the lock plunger and the lock plunger movement in turn controls the movement of the rack, such that the movements are interlocked with one another. When the unit is interconnected with a machine tool, additional limit switches are associated with the tool spindle and interconnected with the electrically operated valves of the indexing and locking cylinders. These switches are effective to cause operation of the cylinders in time with the feeding and retracting movements of the tool spindle for sustained automatic operations. It will be understood that the movements of the rack and locking plunger are interlocked with one another even when the control system is interconnected with a machine spindle in order to insure that movements are executed in proper sequence. The arrangement and function of the several control switches are described in detail later.

It will be understood that the rack 52 advances the table approximately to its final indexed position and that the locking pin 60, upon being shifted to its locking position, corrects any error and brings the table and work piece to a precise position with respect to the spindle. For this purpose, the locking pin tapers outwardly from its forward end rearwardly, and is adapted to enter successive indexing thimbles or sockets 61 which are provided with tapered bores 62 (Figure 3). The thimbles 61 are welded to the table, as indicated at 63, and in order to provide maximum precision, the tapered bores are machined after assembly and preferably in a precision machine tool such as a jig borer.

In order to bring the table to a stop with the bores 62 in registry with the locking pin, there is provided a rack stop, indicated generally at 64, which is arranged to engage the end of rack 52 at the limit of its advancing stroke. The rack stop is adjustably threaded in the side wall of housing 42 in order that it can be regulated for proper registration and also to allow the stroke to be varied in accordance with the number of indexing positions.

It will be understood that a six station table, as shown in the drawings, is normal and lends itself to the majority of machines. Each indexing station is equal to a 60° table advancement and this requires the full stroke of the rack. It will be apparent therefore, that for the particular unit disclosed, the number of stations can be increased by providing a table having the required number of indexing thimbles, and by decreasing the length of rack stroke. Although the adjustable stop 64 can be made long enough to cover the entire range of adjustment, it is preferable to install longer ones for the shorter strokes. The interchangeable tables and stops are preferably installed and adjusted by the supplier so that the indexing unit is furnished ready for installation.

It will be understood that if the required number of indexing stations is beyond the adjustment range of a unit of given size, then a gear 54 having a pitch diameter adapted to change the ratio of table advancement per stroke can be installed. It is contemplated to furnish the units in several sizes such that the variable factors can be met in most cases by table size selection and appropriate stroke adjustment.

As shown in Figure 2, the rack includes at its outer end, a switch actuating rod 65 which slidably projects through the adjustable stop 64. The stop is threaded through a collar 66 welded to the housing and is locked in adjustment by a set screw 67. A packing nut 68 surrounds the rod 65 to prevent leakage of oil from the gear housing. The rod includes at its outer end a pair of switch actuating collars 70—70 secured to the rod for adjustment by means of set screws 71. The collars 70 are adapted to cooperate with limit switches and to cause operation of the means of limit switches with the operating element, such as the spindle of a machine tool, such that the table is indexed in response to movement of the spindle to a retracted position. The spindle remains retracted until the table is indexed, thereupon the control system is effective to initiate the working stroke of the spindle, causing the machining operation to be performed as soon as the work piece is indexed to the spindle. Upon completion of the machining operation, the spindle is retracted automatically, and upon reaching its retracted position, it again initiates the indexing cycle. Under automatic control therefore the operator manually places the work piece in work holding fixtures carried by the indexing table and removes the finished pieces as they advance from the spindle.

Figure 1 illustrates the indexing mechanism mounted upon a conventional drill press as a typical example of the utilization of the mechanism. It will be understood that the indexing mechanism will operate with equal efficiency with various other machines and that the spindle or spindles may be mounted for rotation either upon a vertical axis or upon a horizontal axis. The drill press shown in Figure 1, consists generally of a base 15, mounted upon a support structure 16, with a vertical column 17 rising from the base and carrying upon its upper end a drill head, which is indicated generally at 18. The drill head is of conventional design and includes a vertical spindle, indicated at 20, which is fed axially with respect to the work pieces. Upon the lower end of the spindle there is mounted a drill head 21 of conventional design which is provided with a pair of chucks 22—22 for mounting drills, reamers and the like. Chucks 22—22 are rotated by a gear train within the drill head 21 in the usual manner by means of a motor driven quill (not shown). The drill spindle, including the drill head 21 and chucks 22, is fed vertically by a commercial air or hydraulic operated feed unit which is indicated generally at 23.

The feed unit is provided with a cylinder 24 and a rack and pinion (not shown) which is mounted within the forward end of a housing 25. The rack is connected to the piston of cylinder 24 and the pinion is keyed upon the usual spindle feed shaft 26 which is connected by a second rack and pinion to the vertical spindle 20 of the drill press. Fluid pressure is applied to the respective ends to cylinder 24 by way of the conduits 27—28 to provide forward and reverse motion of the piston. This in turn rotates shaft 26 to cause vertical movement of the spindle in feeding and retracting directions. The spindle is locked against rotation by means of the lug 30 slidably engaging a vertical pin 31 secured to a column 17 by the split collar 32.

The indexing mechanism, which is indicated generally at 33, is mounted upon the base 15 of the drill press, and the indexing table 34 is disposed upon an axis of rotation which is displaced outwardly from the axis of the spindle. Upon the upper surface of table 34 near its periphery, there is mounted a series of work holding fixtures 35. The fixtures are spaced radially with respect to one another a distance corresponding to the degree of advancement of the table upon each indexing cycle. The work holding fixtures thus carry the work pieces 36 serially to axial alignment with the chucks 22 upon each indexing cycle of the table.

For the purpose of illustrating the operation, the chucks are provided with drills 37—37 arranged to drill two holes simultaneously in the work piece upon each indexing cycle. It will be apparent therefore, assuming that the work pieces are accurately indexed and locked with respect to the fixtures 35, that two holes will be drilled at accurately located centers in each successive work piece.

It will be understood that in many instances several work pieces are machined simultaneously upon each indexing cycle by utilizing several spindles which are located on centers matching the centers of the holes to be machined. For example, a hole may be drilled in a work piece at one spindle station, while the corresponding hole may be tapped or reamed in an adjacent work piece at a second spindle station. It will be understood from the foregoing that the indexing mechanism, as an attachment to be applied to various machines, may be capable of adjustment of its rotary advancements in order to change the number of indexing stations.

As explained later in detail, a unit of given size and capacity can be set up for a desired number of stations by providing an appropriate table and by adjusting the stroke of the rack to coincide with the required degree of advancement. In addition, the gear ratio can be altered if required to accommodate those variables which are beyond the adjustment range of a unit of given size.

As noted above, the drill press illustrated in Figure 1 includes a power feed unit 23 which is arranged to impart the vertical feeding and retracting motion to the drill spindle. As applied to the present indexing mechanism, the control system includes limit switches which are effective to initiate the indexing cycles when the spindle is completely elevated and to initiate the downward feed of the spindle after the table is indexed and locked in indexed position. The arrangement of the control system with relation to the drill press and indexing mechanism will be explained in greater detail later.

TABLE DRIVING MECHANISM

The rotary indexing movements are imparted to the table by the indexing cylinder, indicated at 38 in Figure 3, and the table is finally positioned and locked in indexed position by the locking cylinder, indicated at 40. Sustained cyclic advancements of the table are maintained by operation of the two cylinders in time with one another and in time with the movements of the tool spindle. The two cylinders may be energized either by hydraulic pressure or by air pressure, depending upon the type and size of the equipment. It has been found in practice that the performance is practically the same whether the operating medium is hydraulic or pneumatic. The indexing and locking cylinders are both commercial products equipped with electrically operated valves also of commercial design. These assemblies are widely used throughout industry and the valves are of the type which can be adjusted to cushion or progressively slow down the piston as it approaches the stop member at final position.

As best shown in Figure 2, the indexing table 34 is circular and is mounted for rotation upon the vertical stub shaft 41. Shaft 41 is rotatably mounted within the rectangular gear housing 42 which encloses the driving and locking mechanism. The gear housing also provides an oil reservoir for lubricating the moving parts. The shaft 41 is rotatably journalled in the bosses 43 and 44 which are welded to the top plate 45 locking cylinder in time with the reciprocations of the indexing cylinder, as noted earlier.

Rod 65 may further include an adjustable stop collar (not shown) similar to collar 70, adapted to engage stop 64 at the limit of retraction of the racks, in order to provide a greater adjustment range. In other words, the rack stroke may be limited by the stop collar alone or in conjunction with the rack stop 64, as dictated by requirements.

Referring to Figure 3, it will be noted that the table driving system includes a fixed rack section 72 which is mounted above the driving rack 52. The purpose of the fixed rack section is to lock the pinion against rotary movement after shifting out of mesh with the driving rack and gear, as shown in Figures 4 and 5. As the idler pinion is shifted upwardly, its teeth engage the fixed rack while still engaged with the teeth of the driving rack and gear, as shown in Figure 4.

When the pinion is fully elevated, as shown in Figure 5, the driving rack retracts to the position shown in Figure 2, and is stopped with its teeth in alignment with the teeth of the pinion. Thus, when the pinion is shifted downwardly at the start of the next indexing cycle, its teeth mesh in a positive manner with the teeth of the rack and gear. It will be understood that upon being fully lowered, the locking pin also disengages its indexing thimble so that the table is free to advance upon the next driving stroke of the rack.

As shown in Figure 3, the driving rack is slidably mounted in a guide block 73 having side flanges 74—74 which confine the rack against movement in the vertical plane. The guide block also maintains the rack properly in mesh with the teeth of pinion 53. The guide block is mounted upon the side wall of the gear box 42 in alignment with the pinion (Figure 2). As shown in Figure 3, both the guide block and the fixed rack 72 are mounted upon a mounting block 75 which is secured by screws 76 to the side of the gear housing. The guide block and fixed rack are secured by means of screws 77 and 78 to the mounting block.

As explained earlier, the locking pin 60 is adapted to be forced into the thimble bore 62 under predetermined but limited pressure in order to prevent excessive wear and at the same time to insure accurate registration of the table. In addition, the taper of the pin could bind or jam in the thimble if excessive pressure is imposed upon the pin as it reaches final position. As best shown in Figures 3 and 4, a preloaded compression spring 80 is disposed between the base of the locking pin and the forward end of plunger 57. The spring is loosely confined upon a rod 81, which has its lower end threaded into the upper end of plunger 57.

The head 82 of rod 81 is slidable with respect to the bore 83 of the locking pin 60, and in the position shown in Figure 3, the spring is effective to force the pin upwardly with the head seated against the shoulder which is formed at the juncture of bores 83 and 84. As the plunger moves upwardly into its socket to the position shown in Figure 5, the spring permits a slight overrun of the plunger, causing the head 82 of the rod 81 to rise slightly above the shoulder, as indicated at 85.

It will also be noted that a slight amount of end clearance, indicated at 86, is provided between the end of the thimble bore and taper pin. This clearance compensates for wear between the pin and its bore by operation of the preloaded spring. In other words, as the pin wears it will progressively enter the socket for a greater distance and will thus automatically provide precise alignment of the table for the life of the mechanism.

In the position shown in Figure 3, the taper is in indexed position at the end of the rack stroke and the tapered pin is lowered and in position to shift the table slightly, if necessary, to final position as an incident to the locking operation. It will be noted that the locking pin is slidably mounted within the bore of a sleeve 87 which is welded preferably by welding in the top plate 45 of the gear housing. The locking pin is fitted closely within the bore, and upon being elevated to the position shown in Figure 5, effects a rigid locking connection between the table and top plate 45. It will also be noted that the nut 88, which locks the pin 61 to the plunger 57, also functions as a stop to limit the upward movement of the plunger 57 by engagement against the lower end of sleeve 87. In this position the lock pin is fully elevated and the idler pinion is fully meshed with the fixed rack 72.

As outlined earlier, the lock plunger 57 also provides an oil pump for lubricating the moving parts of the indexing mechanism. The plunger is counterturned to provide a shaft 90, loosely journalling the pinion. The pinion is confined against endwise displacement between the shoulder 91 and the nut 88, a washer 92 being interposed between the nut and face of the idler gear. The lower portion of the plunger, which is larger in diameter, is slidably confined in the bore of a cylindrical sleeve 93, which is welded upon the bottom plate 46 of the gear housing.

The lower portion of the plunger cooperates with its bore to form a pump adapted to charge the bore with oil during upward movement, and which is effective to force the oil to the points to be lubricated during downward movement of the plunger. For this purpose an oil passageway 94 is machined in the bottom plate 46, the passageway being in communication with the bore 95 of the cylinder. An oil level, which is indicated at 96, is maintained within the housing, and an intake check valve 97 is effective to permit the flow of oil inwardly from the reservoir to the bore, as indicated by the arrow. An oil inlet 98, which is open to the oil reservoir, communicates with the passageway 94, such that the oil is drawn in during the upward stroke of the plunger.

The intake check valve 97 communicates with a vertical oil supply tube 100 which extends upwardly from passageway 94 to the branch lines 101 and 102 leading respectively to the bearing of the table and to the lock pin sleeve 87. A delivery check valve 103, which permits passage of oil in the direction indicated by the arrow, is inserted in the tube 100 and is adapted to prevent the return flow of oil. Thus upon each upward stroke of plunger 57, oil is drawn into the bore by way of the intake check valve and upon the downward stroke, the intake check valve closes and a shot of oil is forced through the delivery check valve to the points to be lubricated.

It will be noted in Figure 3 that a vertical bore 104 is drilled through the stub shaft 41. The purpose of this bore is to provide an air passageway for the operation of pressure responsive work holding fixtures which may be mounted on the indexing table. As shown, the air pressure is supplied by the conduit 105, which is threaded into the lower end of a tube 106. This tube is secured within the bottom plate 46 and rises upwardly above the oil level of the gear housing to exclude oil from the line. The tube is stationary, there being provided an enlarged bore 107 within shaft 41 to provide a running clearance.

Suitable packing, indicated at 108, is provided at the lower end of the stub shaft within the boss 44 to prevent loss of air pressure. At the upper end of bore 104, the air pressure is conducted by way of conduit 110 and branch conduits 111 to the several work holding fixtures on the table. The packing 108 thus provides a rotary swivel connection between the stationary collar and rotating shaft, such that the air pressure may be conducted directly to the work holding fixtures. The fixtures can be opened and closed at the loading and unloading station by respective valves inserted in the branch lines. These valves may be operated by means of cams (not shown) in response to table rotation in a well known manner.

CONTROL SYSTEM

When the indexing mechanism is interconnected with a machine tool, as shown in Figure 1, to provide rapid automatic operation in time with the movements of the spindle, a control system is utilized, which includes limit switches interconnecting the components and electrically operated valves, as illustrated in Figures 6 and 7. As explained earlier, the indexing mechanism includes its own limit switches which operate in response to the reciprocation of the indexing and locking pistons to complete each cycle automatically once the cycle is initiated. When applied to the machine tool, according to the circuit disclosed, limit switches are added to the spindle or other moving element and arranged to initiate the cycle in response to the movements of the spindle. On the other hand, if the machine tool and indexing mechanism are to be controlled manually, as in setting up and making adjustments, then a hand operated switch is utilized to initiate each cycle.

Described generally, with reference to an indexing cycle, the drill spindle is provided with limit switches which are effective to initiate the indexing cycle when the spindle is retracted or elevated above the work piece, and to perform certain other operations during the downward or feed motion of the spindle. As soon as the spindle is retracted, the indexing cylinder is effective to advance the indexing rack, causing the table to index. As explained earlier, the indexing cylinder includes a limit switch which is effective upon the advancement of the indexing rack to its forward limit, to cause the locking pin to move into engagement with its socket or thimble. In this position of the parts, the table is locked with the work piece aligned with the spindle ready to be machined.

The locking piston includes a limit switch which is effective to cause the spindle to feed downwardly after the locking pin engages its socket. Thus the machining operation begins as soon as the table is locked. A second limit switch is associated with the spindle which is effective to disengage the locking pin and feed the spindle in retracting direction at completion of the machining operation, such that the table is indexed while the spindle retracts.

This sequence of operation constitutes one complete cycle, and it will be understood that upon being fully retracted, the spindle is effective to again trip its limit switch to cause the indexing cycle to be repeated for the next work piece. Thus, the operator simply removes the finished work pieces as they advance from the spindle and replaces them with unfinished pieces, while the apparatus continues to repeat the machining and indexing cycles in an automatic manner.

As indicated previously, the indexing and locking cylinders may be powered either by air or hydraulic pressure according to individual requirements without changing the operating characteristics. The control valves for the cylinders consist essentially of two-position reversing valves, which are shifted by respective solenoid windings disposed at opposite ends of the valve plungers. As illustrated diagrammatically in Figure 8, the solenoid windings are indicated at 112 and 113 respectively, and are energized alternately by the limit switches to provide appropriate piston movements. The valve of Figure 8 is an air valve, shown in simplified form, and exhausting directly into the atmosphere.

As explained earlier, the valves are well known in the industry and are provided with adjustable metering means, such as needle valves, usually with respect to the exhaust ports. The metering means are arranged to bleed off the back pressure and thus cushion or progressively decelerate the piston as it approaches the end of its stroke. In other forms, the metering valve may be placed in operation by the piston as it approaches the end of the stroke; however, for purposes of simplicity the metering valves have been omitted from the present disclosure.

In Figure 6 the valve actuating solenoid windings 112 and 113 of the several valves are labeled to indicate the operation each performs, and it will be noted that each winding is shown individually in circuit with the limit switch which energizes it. It will also be observed in Figure 7, that the cylinders, limit switches and valve windings are shown diagrammatically in cooperating relationship and that corresponding parts are labeled as in the circuit diagram. In Figure 7, the indexing cylinder is shown in retracted position, with the locking pin lowered and the drill spindle retracted, corresponding to Figure 3, and the limit switches of Figure 6 are shown in corresponding positions.

Referring to the circuit diagram, the circuit is powered by the power lines 114 and 115 which may represent standard A. C. service lines. A branch line 116 energizes the rack advance winding indicated at A-1, which is effective to energize the indexing cylinder in a direction to index the table. It will be noted that LS-4 in line 116 is tripped by the spindle collar 117 to closed position since the spindle is retracted. LS-5 also in line 116, is tripped by the lock cylinder collar 118 to closed position since the lock pin is disengaged from the socket. The lock pin is disengaged because the spindle retracts after completing an operation and closes switch LS-7 in branch line 120 energizing winding B-2 of the lock cylinder. This causes the locking pin to be lowered just before the spindle closes switch LS-4 to index the table, as noted above.

From the foregoing, it will be observed that the switches and operating components are shown in a position which they assume at the beginning of an operating cycle, and that the main control switch 121 in line 116 is open, with the entire circuit deenergized. When main control switch 121 is closed to start the automatic operation, the winding A-1 in line 116 will energize the indexing cylinder, causing the rack to advance. Upon advancement of the rack to its outward limit, switch actuating collar 70 trips LS-1 in line 122 to energize winding B-1 of the lock cylinder, causing the lock pin to shift to locking position.

When the lock pin engages the socket, its collar 118 trips switch LS-2 in line 123 to energize winding C-1. Winding C-1 in turn energizes the spindle feed cylinder 24 in a direction to feed the spindle toward the work. It will be noted that winding A-2 is energized simultaneously with C-1 since both are connected in common to line 123. Thus the rack is retracted during the drilling operation to save time, while the table remains locked in indexed position with the idler pinion disengaged.

Normally closed LS-6 is also interposed in line 123. LS-6 is associated with the indexing cylinder and is opened when the rack is fully retracted to deenergize windings C-1 and A-2. Switch LS-6 operates in conjunction with LS-2 to provide an interlock which is effective to preserve the timing between the rack and spindle movements, and at the same time, to allow the spindle to retract as soon as its machining operation is completed. In other words, by operation of LS-6, windings C-1 and A-2 are energized momentarily after the lock pin engages and while the rack is being retracted. Thus the spindle feed is initiated while the rack is still in motion by operation of LS-2.

After LS-6 opens to deenergize windings C-1 and A-2, the valves remain in their respective positions, even though deenergized, until they are energized and shifted to their opposite positions. If LS-6 were omitted from the circuit, the spindle could not be retracted until LS-2 is opened by disengagement of the locking pin, since the winding C-1 would remain energized and would buck winding C-2. The normally closed limit switch LS-6, therefore, permits the drill spindle to retract as soon as it trips LS-3, whether the locking pin is engaged or disengaged, so long as the rack is fully retracted.

From the foregoing explanation, it will be seen that the rack remains stationary with the lock pin engaged as the spindle continues feeding downwardly with respect to the work piece. Upon reaching a predetermined depth, the spindle collar 117 trips switch LS-3 in line 124. Upon being closed, LS-3 energizes winding C-2 which energizes the drill feed unit in retracting direction. The spindle then moves toward its retracted position until it again closes LS-4 in line 116 to energize the indexing cylinder for the next cycle. The switches LS-4 and LS-5 combine with one another as interlocks to prevent advancement of the rack unless the spindle is fully retracted and the lock pin fully disengaged from its socket.

As noted above, the electrically operated valves remain in the position to which they are shifted until their opposite winding is energized to shift the valve plunger to its second position. Thus the limit switches are tripped momentarily to closed position by the switch tripping collars and then returned to open position. With the exception of LS-6, all of the limit switches are normally open and are closed only when tripped by the respective collars.

In order to provide manual regulation, a manually operated switch 125 is provided in the shunt line 126. This line shunts switches LS-4, LS-5 and 121, and allows the cycle to be initiated by hand operation of the switch 125 instead of by the retracting motion of the spindle and lock pin. In the event that the indexing mechanism is utilized with a hand fed spindle, then the limit switches LS-3 and LS-4 of the spindle may be omitted. This will allow the spindle to be fed by hand while the indexing cycles are completed automatically after being initiated by hand. In this event LS-7 is effective to disengage the latch pin when the spindle is retracted.

If it is desired to operate the indexing mechanism entirely by hand, then a second hand operated switch 127 may be interconnected in the line 128 which shunts LS-7. This switch serves to disengage the locking pin at the start of each indexing cycle. Thus it would be necessary, first, to trip switch 127 and then trip switch 125 to disengage the pin before starting the rack advancement. Thereafter, the other operations are executed automatically by the limit switches which are associated with the locking and indexing cylinders. It will be understood that switch 125 can be used to disengage the pin and advance the rack by adding a contact and connecting it to line 120. In this event, the switch 127 and shunt line 128 are omitted.

From the foregoing, it will be understood that the movements of the several components can be regulated by adjustment of the appropriate switch tripping collars. It will also be observed that a pair of collars is mounted upon each switch actuating rod so that the tripping of the switches can be adjusted independently by separate adjustment of each collar. Limit switch LS-7, which disengages the lock pin, is located in a position to be tripped before the spindle is completely retracted so as to speed up the indexing motion. In order to prevent LS-7 from being tripped a second time during feed motion of the spindle, it is provided with a bypass trigger which is inoperative with respect to the switch element during feed motion.

It will be recognized that if the stroke of the indexing piston is changed by adjustment of its positive stop 64, then it will be necessary to adjust the switch tripping collars 70 appropriately in order to properly relate the switches to the new stroke limits. The various limit switches are timed with respect to the components which they operate in a manner to avoid time delays; thus the limit switches execute the several operations of each indexing cycle as rapidly as possible.

MODIFIED STRUCTURE

Figure 9:
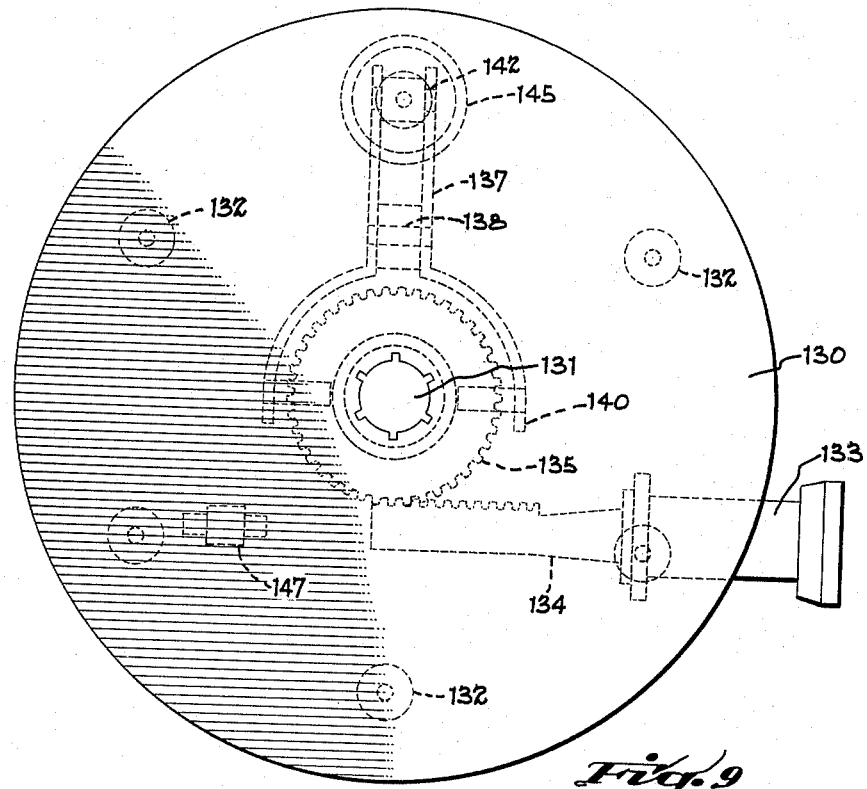
Figure 9 is a top plan view generally similar to Figure 2, illustrating an indexing mechanism having a modified lock pin arrangement.
Figure 10:
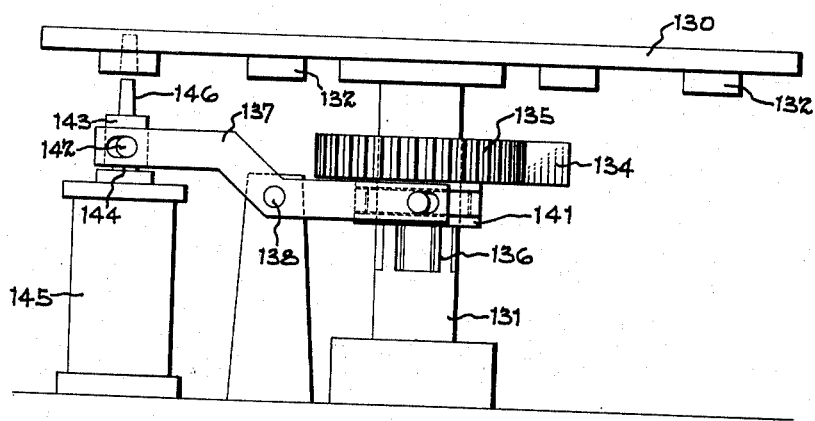
Figure 10 is a side view of the structure illustrated in Figure 9, further illustrating the arrangement of the lock pin and the rack and pinion structure.

The indexing mechanism illustrated diagrammatically in Figures 9 and 10, operates generally upon the same principles as the structure of Figures 2 and 3; however, the idler pinion is omitted and instead the table driving gear is shifted with respect to the rack teeth. As shown, the structure comprises a table indicated at 130 mounted upon shaft 131 having a series of indexing sockets or thimbles 132 similar to those previously described. An indexing cylinder 133 includes a rack 134 meshing with a gear 135 which is slidably splined to the shaft, as at 136.

In the modified structure, the rack is disengaged by shifting the gear 135 downwardly with respect to the splined portion 136 of the shaft, such that the rack may be retracted free of the gear. For this purpose there is provided a lever 137 which is pivotally mounted intermediate its length as at 138, having a yoke portion 140 rotatably connected to the hub of 141 of the gear. The opposite end of lever 137 is pinned as at 142 to a slidable plunger 143 which is attached to the piston rod 144 of the lock cylinder 145. The tapered locking pin 146 projects upwardly from plunger 143 and is adapted to enter the tapered bore of the thimbles when elevated.

It will be understood that by operation of lever 137, upward movement of the locking pin will provide a corresponding downward, disengaging movement of gear 135 upon the splined portion of the shaft. It will also be noted that the locking pin will begin to enter its socket while the gear is still in mesh with the rack, such that there is an overlapping engagement which prevents any shifting of the table while the gear is being shifted out of mesh. When the gear is completely disengaged from the rack, the pin is fully engaged in its socket to align the work piece accurately with respect to the machining element. After the gear is completely disengaged, the indexing cylinder 133 is energized in a direction to shift the rack to a retracted position.

An adjustable rack stop 147, of the type described previously, is arranged to abut the rack at the advance limit of its stroke, so as to align the socket 132 with the axis of the taper pin 146 when the table is indexed. In the position shown in the drawing, the rack is in its retracted position, the gear is engaged with the rack and the locking pin is retracted in the position assumed at the beginning of an indexing cycle. During the cycle, the rack advances toward the left, as shown in Figure 9, until it engages the rack stop 147, whereupon the locking cylinder is effective to raise the lock pin and lower the gear to its disengaged position.

A control system including limit switches associated with the indexing and locking cylinders, as described earlier, is utilized to provide the sequential operations of the two cylinders. It will be understood that the modified structure is adapted to be interconnected with the spindle of a machine in the same manner as described previously, for cyclic mass production operations.

I claim:

1. An indexing apparatus adapted to advance and index work pieces in stepwise progression with respect to the operating element of a machine, said indexing apparatus comprising a rotatable indexing table adapted to support and index the work pieces, an indexing motor having a reciprocating member movable in indexing and retracting strokes, driving means adapted to connect said reciprocating member to said table, said driving means being adapted to convert the lineal motion of the reciprocating member into rotary table motion, the driving means including a shiftable coupling member adapted to couple and uncouple the driving means with respect to the table, and a second motor connected to the shiftable coupling member and adapted to shift the coupling member to coupling and uncoupling positions, the coupling member being adapted to cause rotary advancement of the table during the indexing stroke of the reciprocating member with the coupling member in coupling position, whereby the table remains stationary during the retracting stroke of the reciprocating member with the coupling member in uncoupling position.

2. An indexing apparatus adapted to advance and index work pieces in stepwise progression with respect to the operating element of a machine, said indexing apparatus comprising a rotatable indexing table adapted to support and index the work pieces, an indexing motor having a reciprocating member movable in indexing and retracting strokes, driving means adapted to connect said reciprocating member to said table, said driving means being adapted to convert the lineal motion of the reciprocating member into rotary table motion, the driving means including a shiftable coupling member adapted to couple and uncouple the driving means with respect to the table, a second motor means with respect to the table, a second motor connected to the shiftable coupling member and adapted to shift the coupling member to coupling and uncoupling positions, the coupling member being adapted to cause rotary advancement of the table during the indexing stroke of the reciprocating member with the coupling member in coupling position, whereby the table member in coupling position, whereby the table remains stationary during the retracting stroke of the reciprocating member with the coupling of the reciprocating member with the coupling member in uncoupling position, and control means interconnecting the indexing motor and second motor, said control means including control members associated with both of said motors and responsive to the movements thereof, the control members which are associated with one motor being connected to the other motor and adapted to energize one motor in response to the operation of the other motor, whereby said reciprocating member and coupling member are actuated in sequence to index the table.

3. An indexing apparatus adapted to advance and index work pieces in stepwise progression with respect to the operating element of a machine, said indexing apparatus comprising a rotatable indexing table adapted to support and index the work pieces, an indexing motor having a reciprocating member movable in indexing and retracting strokes, driving means adapted to connect said reciprocating member to said table, said driving means being adapted to convert the lineal motion of the reciprocating member into rotary table motion, the driving means including a shiftable coupling member adapted to couple and uncouple the driving means with respect to the table, a second motor connected to the shiftable coupling member and adapted to shift the coupling member to coupling and uncoupling positions, the coupling member being effective to cause rotary advancement of the table during the indexing stroke of the reciprocating member with the coupling member in coupling position, whereby the table remains stationary during the retracting stroke of the reciprocating member with the coupling member in uncoupling position, and a locking member connected to said shiftable coupling member for movement in time therewith, said locking member being adapted to engage and lock said table in stationary indexed position when the coupling member is shifted to the said uncoupling position, and being adapted to release said table for rotary indexing motion when the shiftable coupling member is shifted to coupling position.

4. An indexing apparatus adapted to advance and index work pieces in stepwise progression with respect to the operating element of a machine, said indexing apparatus comprising a rotatable indexing table adapted to support and index the work pieces, an indexing motor having a reciprocating member movable in indexing and retracting strokes, driving means adapted to connect said reciprocating member to said table, said driving means being adapted to convert the lineal motion of the reciprocating member into rotary table motion, a stop member mounted in a position to engage the reciprocating member at the limit of said indexing stroke, said stop member being adapted to regulate the indexing motion of the table, the driving means including a shiftable coupling member adapted to couple and uncouple the driving means with respect to the table, a second motor connected to the shiftable coupling member and adapted to shift the coupling member to coupling and uncoupling positions, the coupling member being effective to cause rotary advancement of the table during the indexing stroke of the reciprocating member with the coupling member in coupling position, whereby the table remains stationary during the retracting stroke of the reciprocating member with the coupling member in uncoupling position, and a locking member connected to said shiftable coupling member for movement in time therewith, said locking member being adapted to engage and lock said table in stationary indexed position when the reciprocating member engages said stop member and the coupling member is shifted to the said uncoupling position, and being adapted to release said table for rotary indexing motion when the shiftable coupling member is shifted to coupling position.

5. An indexing apparatus adapted to advance and index work pieces in stepwise progression with respect to the operating element of a machine, said indexing apparatus comprising a rotatable indexing table adapted to support and index the work pieces, an indexing motor having a reciprocating member movable in indexing and retracting strokes, driving means adapted to connect said reciprocating member to said table, said driving means being adapted to convert the lineal motion of the reciprocating member into rotary table motion, the driving means including a shiftable coupling member adapted to couple and uncouple the driving means with respect to the table, a second motor connected to the shiftable coupling member and adapted to shift the coupling member to coupling and uncoupling positions, the coupling member being effective to cause rotary advancement of the table during the indexing stroke of the reciprocating member with the shiftable member in coupling position, whereby the table remains stationary during the retracting stroke of the reciprocating member with the shiftable member in uncoupling position, a locking member connected to said shiftable coupling member for movement in time therewith, said locking member being adapted to engage and lock said table in stationary indexed position when the shiftable member is shifted to the said uncoupling position, and being adapted to release said table for rotary indexing motion when the shiftable coupling member is shifted to coupling position, and a control system interconnecting the indexing motor and second motor, said control system being adapted to energize one of said motors in response to the operation of the other of said motors, whereby said reciprocating member is actuated in time with the coupling and locking members to advance, index and lock the table.

6. An indexing apparatus adapted to advance and index work pieces in stepwise progression with respect to the operating element of a machine, said indexing apparatus comprising a rotatable indexing table adapted to support and index the work pieces, an indexing motor having a reciprocating member movable lineally in indexing and retracting strokes, driving means adapted to connect said reciprocating member to said table, said driving means being adapted to convert the lineal motion of the reciprocating member into rotary table motion, said driving means including a shiftable coupling member adapted to couple and uncouple the driving means with respect to the table, a second motor connected to the shiftable coupling member and adapted to shift said member to coupling and uncoupling positions, the shiftable coupling member being effective to cause rotary advancement of the table during the indexing stroke of the reciprocating member with the shiftable member in coupling position, whereby the table remains stationary during the retracting stroke of the reciprocating member with the shiftable member in uncoupling position, a locking member connected to said shiftable coupling member for movement in time therewith, said locking member being adapted to engage and lock said table in stationary position when the shiftable coupling member is shifted to uncoupling position and being effective to release said table for rotary indexing motion when the shiftable coupling member is shifted to coupling position, and a control system interconnected with and adapted to control the operations of both of said motors in sequence, said control system including control members responsive to the movements of the reciprocating member and shiftable coupling member, said control members being adapted to uncouple the shiftable coupling member when the reciprocating member reaches the limit of its indexing stroke and being adapted to couple the shiftable coupling member when the reciprocating member reaches the limit of its retracting stroke, the control system including control members responsive to the movements of the shiftable coupling member adapted to cause the reciprocating member to execute its table indexing stroke when the shiftable coupling member is shifted to coupling position and to cause the reciprocating member to execute its retracting stroke when the shiftable coupling member is shifted to uncoupled position.

7. An indexing apparatus adapted to advance and index work pieces in stepwise progression with respect to the operating element of a machine, said indexing apparatus comprising a rotatable indexing table adapted to support and index the work pieces, a fluid pressure indexing cylinder including a piston adapted to reciprocate lineally in indexing and retracting strokes, driving means adapted to couple said piston to the table and adapted to convert the lineal motion of the piston into rotary table motion, the driving means including a shiftable coupling member adapted to couple and uncouple the driving means with respect to the table, a second fluid pressure cylinder including a piston connected to the coupling member, the piston being adapted to shift the coupling member to said coupling and uncoupling positions, the coupling member being adapted to cause rotary advancement of the table during the indexing stroke of the indexing piston with the coupling member in coupling position, whereby the table remains locked in stationary position during the retracting stroke of the indexing piston with the coupling member in uncoupling position, respective electrically operated control valves connected to each of said cylinders and adapted to regulate the reciprocations of said pistons, respective limit switches mounted with respect to said cylinders, and means connected to both of said pistons adapted to trip said switches in response to the reciprocations of said pistons, the limit switches which are associated with one cylinder being connected electrically to the control valve of the other cylinder and adapted to provide sequential operation of both cylinders in time with one another to reciprocate the indexing piston to its indexing limit and to uncouple the coupling member and engage the locking member at said limit.

8. An indexing apparatus adapted to advance and index work pieces in stepwise progression with respect to the operating element of a machine, said indexing apparatus comprising a rotatable indexing table adapted to support and index the work pieces, a fluid pressure indexing cylinder including a piston adapted to reciprocate lineally in indexing and retracting strokes, driving means adapted to couple said piston to the table and adapted to convert the lineal motion of the piston into rotary table motion, the driving means including a shiftable coupling member adapted to couple and uncouple the driving means with respect to the table, a second fluid pressure cylinder including a piston connected to the coupling member, the piston being adapted to shift the coupling member to said coupling and uncoupling positions, a locking member connected to said shiftable coupling member for movement in time therewith, said locking member being adapted to engage and lock said table in stationary indexed position when the coupling member is shifted to uncoupling position, the coupling member being adapted to cause rotary advancement of the table during the indexing stroke of the indexing piston with the coupling member in coupling position, whereby the table remains locked in stationary position during the retracting stroke of the indexing piston with the coupling member in uncoupling position, and with the locking member engaged, respective electrically operated control valves connected to each of said cylinders and adapted to regulate the reciprocations of said pistons, respective limit switches mounted with respect to said cylinders, and means connected to both of said pistons adapted to trip said switches in response to the reciprocations of said pistons, the limit switches which are associated with one cylinder being connected electrically to the control valve of the other cylinder and adapted to provide sequential operation of both cylinders in time with one another to reciprocate the indexing piston to its indexing limit and to uncouple the coupling member and engage the locking member at said limit.

9. An indexing apparatus adapted to be interconnected electrically with the movable spindle of a machine and adapted to advance and index work pieces in stepwise progression in time with the movements of said spindle, said indexing apparatus comprising a rotatable indexing table adapted to support and index the work pieces, a fluid pressure indexing cylinder including a piston adapted to reciprocate lineally in indexing and retracting strokes, driving means adapted to couple said piston to the table and adapted to convert the lineal motion of the piston into rotary table motion, the driving means including a shiftable coupling member adapted to couple and uncouple the driving means with respect to the table, a second fluid pressure cylinder including a piston connected to the coupling member, the piston being adapted to shift the coupling member to said coupling and uncoupling positions, the coupling member being adapted to cause rotary advancement of the table during the indexing stroke of the indexing piston with the coupling member in coupling position, whereby the table remains stationary during the retracting stroke of the indexing piston with the coupling member in uncoupling position, respective electrically operated control valves connected to each of said cylinders and adapted to regulate the reciprocations of said pistons, respective limit switches mounted with respect to said cylinders, switch actuating means connected to both of said pistons adapted to trip said switches in response to the reciprocations of said pistons, the limit switches which are associated with one cylinder being connected electrically to the control valve of the other cylinder and adapted to provide sequential operation of both cylinders in time with one another to reciprocate the indexing piston to its indexing limit and to uncouple the coupling member at said limit, and a limit switch associated with the spindle of the machine and adapted to be tripped in response to the movement of said spindle in a retracting direction, said switch being connected electrically to the control valve of the second fluid pressure cylinder and adapted to shift the coupling member to coupling position upon retracting movement of the spindle.

10. An indexing apparatus adapted to advance a series of work pieces in rotary stepwise progression with respect to an operating station, said indexing mechanism comprising a rotatable indexing table, a fluid pressure indexing cylinder including a piston adapted to reciprocate lineally in indexing and retracting strokes, a toothed indexing rack connected to said piston, driving means adapted to connect said indexing rack to said table, said driving means being adapted to convert the lineal motion of the indexing rack into stepwise rotary table advancements, said driving means including a shiftable coupling member being adapted to couple said driving means to the table during the indexing stroke of the rack, and being adapted to uncouple the same during the retracting stroke of the rack and thereby provide the stepwise advancements of the table, a locking member mounted for reciprocating movement in time with said coupling member, said locking member being adapted to engage and lock said table in indexed position when the coupling member is shifted to uncoupling position and being adapted to release said table when the coupling member is shifted to coupled position, and a fluid pressure locking cylinder connected to said coupling member and locking member and adapted to shift said coupling and locking members in time with the movements of the indexing rack, whereby the indexing rack and locking member are effective alternately to index and lock said table.

11. An indexing mechanism adapted to advance a series of work pieces in rotary stepwise progression with respect to an operating station, said indexing mechanism comprising a rotatable indexing table having a plurality of radially spaced indexing points, an indexing motor having a driving member which reciprocates lineally in indexing and retracting strokes, a driving system adapted to connect said driving member to said table, said driving system being adapted to convert the lineal motion of the driving member into stepwise rotary table advancements, a shiftable coupling member in said driving system, said coupling member being adapted to couple said driving member to the table during the indexing stroke of the driving member, and being adapted to uncouple the same during the retracting stroke of the driving member to provide the stepwise rotary advancement of the table, a stop member disposed in a position to engage the driving member at the limit of the indexing stroke thereof, said stop member being effective to stop the table approximately in indexed position, a locking pin mounted for axial reciprocating movement in time with said idler member, said table having a plurality of final indexing sockets located at radially spaced points with respect to the axis of rotation of the table, said sockets delineating the indexing points of the table, said locking pin being tapered from its leading end outwardly and being adapted to sequentially enter said sockets as the idler member is shifted to uncoupled position and thereby shift the table into final indexed position.

12. An indexing mechanism adapted to advance a series of work pieces in rotary stepwise progression with respect to an operating station, said indexing mechanism comprising a rotatable indexing table having a plurality of radially spaced indexing points, a rotatable mounting shaft for said table, an indexing cylinder having a piston which reciprocates lineally in indexing and retracting strokes, an indexing rack connected to said indexing piston, a gear keyed to said mounting shaft, a shiftable idler pinion adapted to couple said indexing rack to said gear during the indexing stroke of the indexing rack and being adapted to uncouple the same during the retracting stroke of the rack to provide the stepwise rotary advancement of the table, a stop member disposed in a position to engage the indexing rack at the limit of the indexing stroke thereof, said stop member being adapted to stop the table approximately in indexed position, a locking pin mounted for axial reciprocating movement in unison with said idler pinion, a locking cylinder having a piston connected to the shiftable idler pinion and locking pin for shifting the same, said table having a plurality of final indexing sockets located at radially spaced points with respect to the axis of rotation of the table, said sockets delineating the indexing points of the table, said locking pin being tapered from its leading end outwardly and being adapted to sequentially enter said sockets as the idler pinion is shifted to uncoupled position and thereby shift the table into final indexed position.

13. An indexing mechanism adapted to advance a series of work pieces in rotary stepwise progression with respect to an operating station, said indexing mechanism comprising a rotatable indexing table having a plurality of radially spaced indexing points, a rotatable mounting shaft for said table, an indexing cylinder having a piston which reciprocates lineally in indexing and retracting strokes, and indexing rack connected to said indexing piston, a gear keyed to said mounting shaft, a shiftable idler pinion adapted to couple said indexing rack to said gear during the indexing stroke of the indexing rack and being adapted to uncouple the same during the retracting stroke of the rack, a stop member disposed in a position to engage the indexing rack and limit the indexing stroke thereof, said stop member being effective to stop the table approximately in indexed position, a fixed rack disposed in spaced parallelism with the indexing rack, the shiftable idler pinion being adapted to mesh with said fixed rack when shifted to uncoupled position to lock the pinion against rotation, a locking pin mounted for reciprocating movement in unison with said idler pinion, a locking cylinder having a piston connected to the shiftable idler pinion and locking pin for shifting the same, said table having a plurality of final indexing sockets located at radially spaced points with respect to the axis of rotation of the table, said sockets delineating the indexing points of the table, said locking pin being tapered from its leading end outwardly and being adapted to sequentially enter said sockets when the idler pinion is shifted to uncoupled position and thereby shift the table into final indexed position.

14. An indexing apparatus adapted to advance a series of work pieces in stepwise progression with respect to an operating station, said indexing apparatus comprising a rotatable indexing table, a drive shaft fixed to the table, bearing means journalling said shaft for rotary movement, a gear fixed to said shaft, an indexing motor including a rack adapted to reciprocate lineally in indexing and retracting strokes with respect to said gear, a shiftable idler pinion adapted to be interposed between said rack and gear in meshing engagement to index said table upon reciprocation of said rack in its indexing stroke, a slidable mounting shaft for said idler, said shaft loosely journalling said pinion and adapted to shift the pinion along its axis of rotation from a meshed to an unmeshed position with respect to said rack and gear, a locking element mounted upon and projecting from an end of said mounting shaft for movement in unison with the idler pinion, lock means on said table adapted to be engaged by said locking element when the pinion is shifted to unmeshed position, a locking motor connected to said mounting shaft and adapted to shift the same longitudinally and thereby to mesh and unmesh the idler pinion and concurrently to disengage and engage said locking element, and control means interconnecting the indexing and locking motors adapted to energize the same alternately to provide stepwise indexing advancement and locking of the table.

15. An indexing apparatus adapted to advance a series of work pieces in rotary stepwise progression with respect to an operating station, said indexing apparatus comprising a rotatable indexing table, a drive shaft fixed to the table at said axis of rotation, bearing means journalling said shaft for rotary movement, a gear fixed to said shaft, an indexing motor including a rack adapted to reciprocate lineally in indexing and retracting strokes with respect to said gear, a shiftable idler pinion adapted to be interposed between said rack and gear to provide a driving connection between said rack and gear and thereby index said table upon reciprocation of said rack in said indexing stroke, a slidable mounting shaft for said idler pinion, said shaft loosely journalling said pinion and adapted to shift the same along its axis of rotation from a coupled to an uncoupled position with respect to said rack and gear, a tapered locking pin projecting from an end of a said mounting shaft for movement in unison with the idler pinion, said table having indexing sockets adapted to be engaged by said locking pin when the pinion is shifted to uncoupled position, a yieldable element interposed between said mounting shaft and said tapered locking pin, said yieldable element adapting the mounting shaft to move axially with respect to said locking pin when the same engages one of said sockets, said yieldable member being adapted to apply a predetermined pressure upon said locking pin when the same is seated in said socket, a locking motor connected to said mounting shaft and adapted to shift the same longitudinally and thereby to couple and uncouple the idler pinion and concurrently to disengage and engage said locking pin, and control means interconnecting the indexing and locking motors and adapted to energize the same alternately to provide stepwise indexing advancement and locking of the table.

16. An indexing apparatus adapted to advance a series of work pieces in stepwise progression with respect to an operating station, said indexing apparatus comprising a rotatable indexing table, a drive shaft fixed to said table, bearing means journalling the drive shaft for rotary motion, a gear fixed to said drive shaft, an indexing cylinder including a piston, a rack secured to said piston and adapted to reciprocate in indexing and retracting strokes with respect to said gear, a shiftable idler pinion adapted to be interposed in meshing engagement between said rack and gear and adapted to index said table during the indexing stroke of the rack, a slidable mounting shaft for said idler pinion, said shaft loosely journalling said pinion and adapted to shift the pinion along its axis of rotation from a meshed to an unmeshed position with respect to said rack and gear, a rod projecting from said mounting shaft toward the indexing table, a locking pin slidably mounted upon said rod and having a forward end projected toward the table, said locking pin being tapered outwardly from said forward end, a compression spring interposed between the rearward end of said locking pin and said mounting shaft adapting the pin to yield longitudinally with respect to the rod and mounting shaft, said table having indexing sockets adapted to be engaged by said locking pin when the pinion is shifted to unmeshed position, said compression spring being adapted to yield in response to engagement of the pin in said socket under predetermined pressure, and a locking cylinder connected to said mounting shaft adapted to shift the same longitudinally, and thereby to mesh and unmesh the idler pinion and concurrently disengage and engage said locking pin.

17. An indexing apparatus adapted to advance a series of work pieces in rotary stepwise progression with respect to an operating station, said indexing apparatus comprising a rotatable indexing table, a drive shaft fixed to the table at said axis of rotation, bearing means journalling said shaft for rotary movement, a gear fixed to said shaft, an indexing motor including a rack adapted to reciprocate lineally in indexing and retracting strokes with respect to said gear, a shiftable idler pinion adapted to be interposed between said rack and gear to provide a driving connection between said rack and gear and thereby index said table upon reciprocation of said rack in its indexing stroke, a slidable mounting shaft for said idler pinion, said shaft loosely journalling said pinion and adapted to shift the same along its axis of rotation from a coupled to an uncoupled position with respect to said rack and gear, a locking element mounted upon and projecting from said mounting shaft for movement in unison with the idler pinion, locking means on said table adapted to be engaged by said locking element when the pinion is shifted to uncoupled position, a locking motor connected to said mounting shaft and adapted to shift the same longitudinally and thereby to couple and uncouple the idler pinion and concurrently to disengage and engage said locking element, control means interconnecting the indexing and locking motors and adapted to energize the same alternately to provide stepwise indexing advancement and locking of the table and an oil pump cylinder, said mounting shaft having an end slidably confined within said cylinder, the cylinder having oil intake and delivery passageways, said delivery passageways being adapted to deliver a shot of oil to the indexing apparatus upon shifting of the mounting shaft.

18. An indexing apparatus adapted to advance a series of work pieces in stepwise progression with respect to an operating station, said indexing apparatus comprising a housing adapted to provide an oil reservoir, a drive shaft rotatably journalled in said housing and having an end projecting externally from the housing, an indexing table fixed upon the external end of said shaft above the housing, a gear fixed to said shaft, an indexing cylinder including a piston, an indexing rack secured to said piston and adapted to reciprocate in indexing and retracting strokes, a shiftable idler pinion adapted to be interposed in meshing engagement between said rack and gear and to index said table upon reciprocation of the rack in said indexing stroke, a slidable mounting shaft for said idler, said shaft loosely journalling said pinion and adapted to shift the pinion along its axis of rotation from a meshed to an unmeshed position with respect to said rack and gear, a locking element mounted upon and projecting from an end from said mounting shaft, locking means on said table adapted to be engaged by said locking element when the pinion is shifted to unmeshing position, a locking cylinder having a piston connected to said mounting shaft and adapted to shift the same longitudinally, a collar secured within said housing having a cylindrical bore, said mounting shaft having an end slidably mounted within said cylindrical bore, the cylindrical bore including an oil intake passageway communicating with the oil reservoir of the housing and adapted to charge said cylinder with oil upon the shifting of said mounting shaft to unmeshed position, and an oil delivery conduit extending from said cylindrical bore, said conduit being adapted to deliver a shot of oil to the indexing apparatus upon shifting of the mounting shaft to meshing position.

H. BRUCE SCHOFIELD.

References Cited in the file of this patent
UNITED STATES PATENTS

| Number | Name | Date |
|---|---|---|
| 1,968,990 | Carlson | Aug. 7, 1934 |